July 14, 1959  G. T. KODAMA  2,895,093
ELECTRICAL CAPACITOR
Filed July 22, 1954

INVENTOR.
GEORGE T. KODAMA
BY
HIS ATTORNEY.

United States Patent Office 2,895,093
Patented July 14, 1959

2,895,093
ELECTRICAL CAPACITOR

George T. Kodama, deceased, late of Dunstable, Mass., by Lloyd T. Kodama, administrator, Mountain View, Calif., assignor to Sprague Electric Company, North Adams, Mass., a corporation of Massachusetts Application July 22, 1954, Serial No. 444,944

2 Claims. (Cl. 317—242)

This invention relates to electric capacitors, and particularly to such capacitors that can be speedily and readily connected in a circuit.

Much improvement has been made in ceramic electrostatic capacitors in recent years by refinement of the ceramic dielectric body. The construction of devices using such ceramic bodies has lagged behind however, particularly with respect to mechanical strength, economy of production and encapsulation so to exploit the electrical characteristics of the body. The Grundmann United States Letters Patent No. 2,159,793 shows relative simplicity of construction, but suffers from mechanical weakness, susceptibility to moisture and low breakdown potentials. Other teachings, such as Dressell U.S. Patent No. 2,436,208, lack internal mechanical strength, a high breakdown potential, a useful resonant frequency, and ease of rigidly mounting it on a chassis. Further deficiencies of known ceramic capacitors include a non-uniform radial path to ground for high resonant frequencies, ineffective shielding and expensive hermetically sealed construction.

Among the objects of the present invention is the provision of a capacitor that can be very easily mounted on a support such as a circuit-carrying chassis, and does not require access to both sides of the chassis.

The above, as well as additional objects of the present invention, will be more completely understood from the following description of several of its exemplifications, reference being made to the accompanying drawings wherein.

Figure 1:
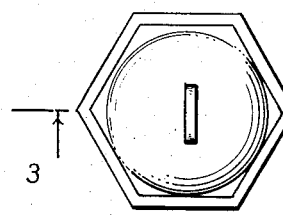
Fig. 1 is a plan view of one form of capacitor according to the present invention.
Figure 2:
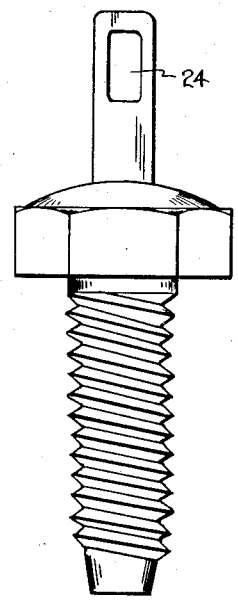
Fig. 2 is a side view of such a capacitor.

According to the present invention a highly practical and convenient capacitor unit has been developed by fixing the essential elements of a capacitor on a mounting structure provided with a threaded shank for threadedly engaging a support and providing the mounting structure with drive elements by which the threaded shank can be securely screwed home into the support. The threaded shank is preferably of the self-tapping type so that it is readily anchored in an unthreaded aperture in the support, and the shank can be connected as a terminal lead of the capacitor.

More specifically, my invention is embodied in a ceramic capacitor comprising the combination of a number of elements including an open-ended non-circular cup, a threaded mounting shaft integral with the bottom of the cup, a capacitor dielectric provided with an electrode surface and so positioned within said cup so as to constitute the cup a second electrode of the capacitor, and a substantially moisture-proof dielectric and protective resin covering the capacitor dielectric and filling the cup. This capacitor represents a marked advance in overcoming the deficiencies of known devices particularly in economy of production, mechanical internal strength, improved resonant frequency, ease of mounting in a mechanically rigid manner, improved shielding of active element, hermetic sealing and increased breakdown potentials.

Referring to the figures, a capacitor dielectric in the form of a small disc 10 is shown as having electrodes 12, 14 coated on its opposed faces. One electrode 14 is secured as by solder against the inner surface of a cup-shaped holder 16 which is provided with an integral threaded shank or stem 18. The inner diameter of the cup 16 should be at least 1½ times the depth of the cup.

To the other electrode 12 is secured a terminal tab 20. The secured end of the tab may be bent over to provide an ear 22 having an electrode-contacting surface large enough to establish good contact and improve the tab support. A slot 24 in the projecting portion of the tab provides a more convenient arrangement for connecting circuit leads to the tab by the usual soldering technique.

For threading the shank home in a support such as a circuit-carrying chassis, the cup 16 is shown as provided with rotating drive elements in the form of a hexagonally-shaped exterior configuration (see Fig. 1). A socket wrench having a corresponding hexagonal socket can then be slipped over the projecting portion of the tab 20 and over the cup 16 to act as a screw-driver type of wrench to drive the threaded shank home or extract it from the support. An ordinary open-end or box wrench can also be used as a driving or extracting tool.

Figure 4:
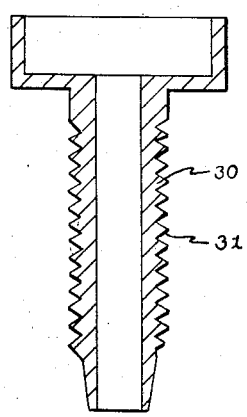
Fig. 4 is a sectional view of another embodiment of a capacitor housing.

Fig. 4 shows a cross-section of a holder and stem suitable for use herein. In this instance, stem 30 is hollow, thus providing more resiliency to thread portion 31. It also becomes possible to solder the capacitor element through the hollow stem.

Figure 3:
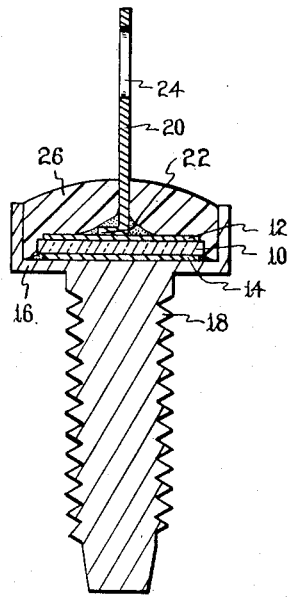
Fig. 3 is a sectional view of the capacitor of Fig. 1 taken along the line 3—3.

For protection of the active portion of the capacitor from external influences such as atmospheric moisture and handling, the dielectric 10 and its electrodes 12, 14 are covered by suitable dielectric coatings or sealing compound. In the embodiment shown in detail in Fig. 3 the cup 16 is filled with a resin 26 which is introduced as a liquid or paste and then hardened as by thermal curing. One very suitable class of protecting material is the cross-linked epoxyline resin which has been extensively covered by journal publications and in the patent literature, e.g. British Plastics for November 1948, pp. 521–527 and U.S. Patent Nos. 2,324,483, 2,506,486, 2,444,333, 2,615,007 and 2,592,560. These epoxyline resins are cross-linked by use of acid or alkaline catalysts. They may also be used in conjunction with other resins, such as alkyd types and formaldehyde condensation resins. These resins are of the so-called casting type and can be fully cured to show very good adhesion to metals without the use of pressure and without an undue amount of shrinkage, also exhibiting high dielectric strength, excellent volume resistivity and stability against moisture penetration.

Other thermoset resins are desirable particular phenolic types as phenol formaldehyde curable by application of heat and/or pressure.

Other suitable thermoplastic protecting materials are the polyesterstyrene copolymers of the type described in Ellis U.S. Patent No. 2,255,313 granted September 8, 1941. Diallyl phthalate resins, thermoplastic resins in general, and high temperature waxes can also be used. All these can be cast directly in place and do not require the application of mechanical pressure for the desired curing. If desired, however, other protective materials such as phenolic, alkyd, acrylic, melamine-aldehyde and cellulosic resins can be applied either to fill the cup 16 or as relatively thin coatings over the dielectric 10 and its electrodes.

Fillers, as for example, talc, finely ground silica and colored oxides, are advantageously incorporated in the protective compound 26. They not only reduce the cost of the protecting mixture, but reduce its thermal expansion and thereby improve its sealing properties under varying temperatures. In addition, the fillers can be used to distinctively color the sealing compound and thereby identify the particular type of capacitor it protects, so that its capacitance does not have to be measured after it leaves the manufacturer. The preferred protective materials are of the filled thermoset type, particularly silica filled phenolic or epoxy type resins. With such a protective coat the breakdown potential of the capacitor is much improved, e.g. the epoxy resin exhibits a twenty fold increase in breakdown (volts per mil) potential over that of air. For high voltage applications the silica filled phenolic protective coat and position-maintaining resin is preferred as the volume resistivity approximates that of the ceramic body so that in operation the potential gradient is distributed across the resin as well as the body. This makes possible higher imposed potentials without breakdown. The range of silica is from 20% to 70% of the total weight of the silica-resin mixture.

The capacitor dielectric 10 can be of any desired type. For capacitances as high as 0.001 microfarad for 400 volt operation, in a cup having a diameter of about ¼ inch and a depth of about 40 to 50 mils, a barium-strontium titanate (20 to 30% barium titanate) ceramic disc having a dielectric constant of about 3500 and a thickness of 10 to 15 mils is a very effective dielectric. The disc can be provided with fired-on silver electrode coatings on its opposed faces in the conventional manner and one silver coating 14 is soldered or sweated against the bottom of the cup. The tab 20 can also be soldered in place against the other electrode at the same time, or if desired in a preliminary or subsequent treatment. The protective compound 26 is then applied and cured to complete the preparation.

Other capacitor dielectrics can also be used, particularly for the lower capacitances. Thus for example, titanium dioxide plates, glass or mica sheets, filled or unfilled resins such as polytetrafluoroethylene or styrene-divinyl benzene copolymers are satisfactory. Capacitor dielectrics of thermosetting or high temperature thermoplastic resins are preferred where they are subjected to soldering or other high temperature treatments.

The electrodes 12, 14 need not be adherently united coatings on the capacitor dielectric, but can be foils or coating strata clamped in place by the sealing compound 26, the tab 20 acting as a temporary positioning and holding means during the hardening or curing of this compound.

According to the present invention, the capacitor can also be of the stacked type having more than one dielectric sheet either adherently united into one assembly as by soldering their electrode faces on both sides of intermediate foils, or clamped together by the sealing compound as above indicated. The intermediate foils can be connected to the proper capacitor terminals as by projecting portions which extend up through the sealing compound and are externally soldered in place.

According to a modified form of the invention more than one capacitance can be provided, for example, by using separate dielectric plates fixed side-by-side in cup 16. Some of the electrodes of the separate plates may be interconnected and one or more leads can project out like the tab 20 of Fig. 3. Alternatively, a single capacitor dielectric can be provided with three or more separate electrodes to meet separate capacitance sections.

The shank 18 need not be solid but can be of hollow tubular construction, in which case the tubular passageway in the shank can communicate with the cup as shown in Fig. 4. This type of structure is simple to manufacture and the communicating passageway can be closed off by the lower electrode 14 of the capacitor.

The thread of the shank is preferably of the self-tapping kind so that it cuts its way into threaded engagement with the edge of a suitably sized hole provided in the support, a radio chassis for example. In such a construction, the threaded portion of the shank is of relatively hard metal such as hardened tool or high-carbon steel where the chassis is of a moderately hard metal. At the same time the shank should be fairly sturdy and if hollow, its wall thickness should be substantial to withstand the driving forces required to cut threads into a chassis of thick metal. A feature of the self-tapping construction is that the support need not be threaded beforehand but is merely provided with a small punched or drilled aperture about $3/32$ inch in diameter, for example. Furthermore, the self-tapping construction digs itself securely in place and does not require lock washers for permanent anchoring. Such a provision makes it possible to easily mount my device in a rigid manner on a chassis.

In place of the hexagonal bolt head type of driving surface, the mounting structure of cup 16 may have any other noncircular configuration such as square, pentagonal, etc. Alternatively, the cup may have its upper edge slotted to form sections of a typical screw-driver slot for engagement by a screw driver of the type having an elongated tube with slot-engaging teeth at one end. In this case the resin filler will not be used to fill the entire cup or tube, and thus will not interfere with the slot engagement. The tube should be long enough to slip over and receive the projecting tab, and bring its teeth into the slots. The number of slots used can be varied from 2 to 6 or more.

The tab 20 is made either relatively rigid or easily pliable, whichever is desired. The rigid form is more easily connected when the capacitor is mounted, since it holds itself securely in place against the pressure of an applied soldering iron or other connecting implement. On the other hand a pliable tab can be made longer and still be folded down to permit the use of standard mounting tools not having correspondingly deep sockets. Longer tabs can also be used to carry identification marks without danger of being obscured by a soldered connection. According to a further embodiment of the invention, two tabs or a single elongated tab connected to the capacitor electrode at the middle portion of the tab may be used to provide a feed-through type of capacitor connection in which the electrical distance from the feed-through circuit to ground (cup or shank) is very small and the bypassing impedance thereby greatly reduced.

The use of a conductive (metal) shank 18 as a capacitor lead is particularly advantageous where the capacitor is connected in a high-frequency circuit. The shank makes a very substantial conductive connection that not only has a very large effective cross-section but a very short effective length. These factors all combine to provide an exceedingly low inductance to the capacitor with a much higher resonant frequency. The shank and cup can be made of electrically non-conductive material such as resin where the capacitor is not to be directly grounded to its support. In this form of the invention the thread on shank 18 is preferably made somewhat coarser than with metal shanks, and can be plated with metal to give more effective threading. The lead wire to the "lower" electrode could be run down through the resin shank being insulated from the threaded portion.

As many apparently widely different embodiments of this invention may be made without departing from the spirit and scope hereof, it is to be understood that the invention is not limited to the specific embodiment hereof except as defined in the appended claims.

What is claimed is:

1. A quick change capacitor capable of rapid insertion in and removal from a circuit, said capacitor comprising an electrically conducting open-ended non-circular flat bottom cup having an integral depending self-tapping threaded shank portion, drive elements on said cup, a ceramic disc silvered on opposed flat faces, one of said faces mounted in electrically conducting relationship within said cup, an electrically conducting tab attached to the other of said faces, said cup filled with a thermoset dielectric resin, said resin encapsulating said disc and securing said disc and said tab in fixed relationship within said cup and electrically insulating said other face from said cup and rigidifying said cup whereby said drive elements provide means for rotation driving of said capacitor while said parts are maintained in fixed relation.

2. A quick change capacitor capable of rapid insertion in and removal from a circuit, said capacitor comprising an electrically conducting open-ended non-circular flat bottom cup having an integral depending threaded shank portion, drive elements on said cup, a ceramic disc silvered on opposed flat faces, one of said faces mounted in electrically conducting relationship within said cup, an electrically conducting tab attached to the other of said faces, said cup filled with a thermoset dielectric resin, said resin encapsulating said disc and securing said disc and said tab in fixed relationship within said cup and electrically insulating said other face from said cup and rigidifying said cup whereby said drive elements provide means for rotational driving of said capacitor while said parts are maintained in fixed relation.

References Cited in the file of this patent

UNITED STATES PATENTS

| | | |
|---|---|---|
| 2,159,793 | Grundmann | May 23, 1939 |
| 2,436,208 | Dressel | Feb. 17, 1948 |
| 2,549,393 | Siesel | Apr. 17, 1951 |
| 2,549,424 | Carlson | Apr. 17, 1951 |
| 2,577,005 | Di Giacomo | Dec. 4, 1951 |
| 2,695,443 | Wagner | Nov. 30, 1954 |

OTHER REFERENCES

"Araldite," British Plastics, November 1948, pages 521–527.